US005394136A

United States Patent [19]

Lammers et al.

[11] Patent Number: 5,394,136

[45] Date of Patent: Feb. 28, 1995

[54] SATELLITE COMMUNICATION AND TRUCK DRIVER BONUS NOTIFICATION AND AWARDS SYSTEM

[75] Inventors: David G. Lammers, Marion; Guy M. Gooch, Alburnett, both of Iowa

[73] Assignee: Rockwell International Corporation, Seal Beach, Calif.

[21] Appl. No.: 114,254

[22] Filed: Aug. 30, 1993

[51] Int. Cl.[6] ............................................ B60Q 1/00

[52] U.S. Cl. .................................. 340/439; 340/438; 364/424.04

[58] Field of Search ..................... 340/425.5, 438, 439, 340/441, 456, 905, 988, 989, 990, 991, 993, 995; 364/424.01, 424.03, 424.04, 436, 443, 406, 408

[56] References Cited

U.S. PATENT DOCUMENTS

| | | | |
|---|---|---|---|
| 4,258,421 | 3/1981 | Juhasz et al. | 364/424.04 |
| 4,647,902 | 3/1987 | Teshima et al. | 340/439 |
| 4,804,937 | 2/1989 | Barbiaux et al. | 340/425.5 |
| 4,843,578 | 6/1989 | Wade | 340/441 |
| 4,939,652 | 7/1990 | Steiner | 340/438 |
| 5,025,372 | 6/1991 | Burton et al. | 364/406 |
| 5,309,139 | 5/1994 | Austin | 340/438 |

FOREIGN PATENT DOCUMENTS

| | | | |
|---|---|---|---|
| 0542421 | 5/1993 | European Pat. Off. | 340/439 |

*Primary Examiner*—Brent Swarthout
*Attorney, Agent, or Firm*—Gregory G. Williams; M. Lee Murrah; H. Fredrick Hamann

[57] ABSTRACT

A system for monitoring, reporting, encouraging and rewarding proper operation of a vehicle from a fixed location including the appropriate selection of speed sensor, tacometer, fuel flow sensor, gear shift position sensor and brake pedal pressure sensor coupled to a performance monitor which compares the information from the sensors with predetermined acceptable ranges and issues an excess report when the sensed signals exceed the predetermined ranges, a receiver/transmitter for transmitting the excess report to the fixed location where a decision regarding whether to issue a driver bonus reward is made and communicated back to the receiver/transmitter which is coupled to a printer, display/keyboard on board the vehicle for printing a bonus check or notification reward in response to the determination received from the fixed location.

3 Claims, 1 Drawing Sheet

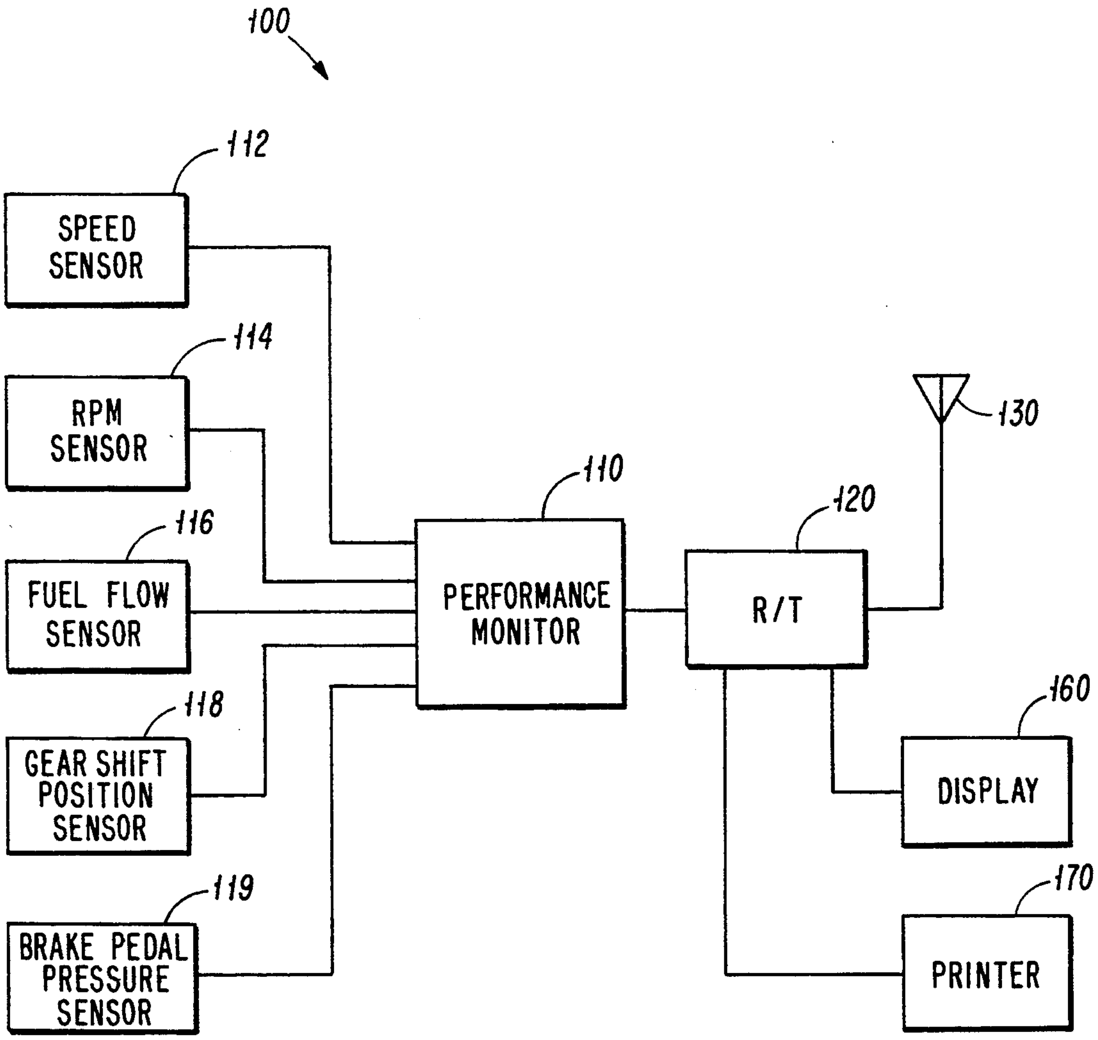
100
112
SPEED SENSOR
114
RPM SENSOR
116
FUEL FLOW SENSOR
118
GEAR SHIFT POSITION SENSOR
119
BRAKE PEDAL PRESSURE SENSOR
110
PERFORMANCE MONITOR
120
R/T
130
160
DISPLAY
170
PRINTER

SATELLITE COMMUNICATION AND TRUCK DRIVER BONUS NOTIFICATION AND AWARDS SYSTEM

FIELD OF THE INVENTION

The present invention generally relates to systems for controlling the operation of large long-haul trucks, and more specifically concerns electronic satellite communication systems for monitoring the operation of a truck and notifying the truck driver of a driver bonus award.

BACKGROUND OF THE INVENTION

In the past, trucking companies have employed numerous techniques and systems to control and encourage the proper operation of their trucks. Improper or inefficient operation of the trucks can result in considerable waste, especially when it occurs in numerous trucks within the fleet. One particular system that has been employed in the past utilizes a trip recorder, which is placed onboard the truck to monitor the vehicle speed, engine RPMs, fuel flow rate, etc. With such onboard recording devices, these indicia of vehicle operation are recorded on some recording means, such as a tape or disk, and later periodically removed from the vehicle and provided to a trucking company where a report of the vehicle operation is generated. In some trucking companies, if a vehicle has been operating within the predetermined desired parameters, the truck driver will be eligible for a cash bonus.

While this system has been used in the past to monitor and encourage correct operation of the truck it has definite drawbacks and shortcomings.

The driver is typically rewarded many days, if not weeks, after the time period in which the truck was properly operated. This delay in notification and award tends to diminish the importance of the proper operation of the vehicle to many drivers.

Consequently, there exists a need for improvement in systems for monitoring and encouraging the proper operation of trucks.

SUMMARY OF THE INVENTION

It is an object of the present invention to increase the level of care provided to trucks by the drivers operating them.

It is a feature of the present invention to include a satellite communication system for communicating operation data and drivers bonus award information.

It is an advantage of the present invention to provide the driver with a quick notification and reward for proper truck operation.

The present invention provides an enhanced system for controlling and encouraging truck driver care in the operation of a truck by providing timely notification and rewards for proper vehicle operation. The invention is carried out in a "delay-less" system in the sense that the typical several week to several month delay in rewarding or even notifying a driver of the benefits of proper operation is eliminated. Instead, a satellite communication system is employed to continuously monitor the drivers performance and quickly reward the driver when appropriate.

Accordingly, the present invention relates to a system for controlling the operation of a truck which includes an onboard performance monitor which monitors the speed, engine RPM, brake pressure, gear shift position of the vehicle, and etc., along with a receiver/transmitter for transmitting such data over a satellite communication link to a remote home base where a bonus is calculated and awarded. The system further having a control/display unit for displaying to the driver the amount of the award and further including an onboard printer for printing an award check or other means for providing the driver with a choice of locations to receive his award through an electronic funds transfer system based upon the calculation made at the remote home base.

BRIEF DESCRIPTION OF THE DRAWINGS

The invention may be more fully understood by reading the following detail description in conjunction with the appended drawing; wherein, the FIGURE is a block diagram of the system of the present invention which is disposed in a typical environment.

DETAIL DESCRIPTION

Now referring to the FIGURE, there is shown a truck operation control and monitoring system, of the present invention, generally designated 100, having a performance monitor 110 therein, which receives inputs from a selection of numerous sensors including a vehicle speed sensor 112, an engine RPM sensor 114, a fuel flow sensor 116, a gearshift position sensor 118 and a brake pedal pressure sensor 119. Performance monitor is preferably coupled to a receiver/transmitter (R/T) 120 which is coupled to an antenna 130, which together are used to transmit the information derived from the sensors 112, 114, 116, 118 and 119 to a remote station, not shown, via a satellite 150 or in an alternative embodiment through a terrestrial radio link directly connecting the antenna 130 with the remote station. Also coupled to the receiver transmitter 120 is control/display unit 160 which is an input/output device which may include a video display and a keyboard where the truck driver is allowed to interface with the receiver transmitter 120 and enter and view data. Coupled to control/display unit 160 is printer 170 which preferably includes preprinted blank check forms disposed therein which are used to print negotiable checks in response to reward signals received back from the remote station through R/T 120. Reward signals in response to an earlier reception at remote station of performance data from sensors 112, 114, 116, 118 and 119 can be viewed on the display.

Performance monitor 110 may be a widely known and commercially available monitor. Sensors 112, 114, 116, 118, and 119 all are well known in the art and are commercial products available from several sources. Receiver/transmitter 120 and antenna 130 also are well known in the art and are available form several sources. The individual selection of which R/T 120, antenna 130 and sensors 112, 114, 116, 118 and 119 to use, may necessitate various levels of adaptation or customization to provide for proper interconnection. All such adaptation and customization is a matter of the design choice and requires no experimentation.

In operation, the truck control system of the present invention provides for enhanced encouragement and control of the truck by constantly monitoring the sensed parameter to determine if they remain within certain predetermined ranges and generating a report of excessive speed, engine RPMs, fuel flow rate, and brake pressure when the sensed parameters exceed the predetermined ranges or in the alternative to record or pass all data as it is sensed to the trucking company. This report is communicated to the trucking company headquarters where a decision is made regarding providing the driver with a timely reward for proper truck operation.

It is thought that the satellite communication truck control system of the present invention and many of its attendant advantages will be understood from the foregoing description, and it will be apparent that various changes may be made in the form, construction and arrangement of the parts thereof without departing from the spirit or scope of the invention, or sacrificing all of its material advantages. The form herein before described being merely preferred or exemplary embodiments thereof.

We claim:

1. A system for controlling the operation of a vehicle from a fixed location comprising:

a receiver/transmitter on board the vehicle for communicating information between said vehicle and the fixed location;

a speed sensor for generating electric speed signals representative of the speed of the vehicle;

a performance monitor, coupled to the speed sensor, for receiving the electric speed signals and comparing said electric speed signals with a predetermined range of acceptable signal levels and generating an excessive speed report when said electric speed signals exceeds said predetermined range;

the performance monitor coupled to said receiver/transmitter providing the reports to the fixed location for determining whether a driver bonus will be initiated by generating a bonus signal; and an input/output unit coupled with said receiver/transmitter for providing a visual notification of said driver bonus in response to the bonus signal and further for providing a choice of receiving locations for receiving said bonus.

2. A system for improving the operation of a vehicle comprising;

a performance monitor;

a speed sensor, coupled to the performance monitor, for sensing the speed of the vehicle, and generating a speed signal representative of the speed of the vehicle;

an RPM sensor, coupled to the performance monitor, for sensing the engine RPM's of the vehicle, and generating an RPM signal which is representative of the RPMs of the vehicle;

a fuel flow sensor, coupled to the performance monitor, for sensing the fuel being consumed by the vehicle, and generating a fuel flow signal in response thereto which is representative of the fuel consumption rate of the vehicle;

a gear shift position sensor, coupled to the performance monitor, for sensing the position of the gear shift lever and generating a gearshift position signal;

a brake pedal sensor, coupled to the performance monitor, for measuring a pressure exerted on a brake pedal on the vehicle and generating a brake pedal pressure signal in response thereto;

the performance monitor compares the speed signal, RPM signal, fuel flow signal, gear shift position signal, and brake pedal sensor signal, with predetermined acceptable ranges and issuing an excessive signal report when the predetermined acceptable ranges are exceeded;

a receiver/transmitter onboard the vehicle for communicating between the vehicle and a remote location; and, an input/output unit coupled with the receiver transmitter for displaying a notification of a driver bonus based upon conformance with a predetermined criteria based upon said excessive signal report and inputting a choice of location for receiving said driver bonus.

3. A system for providing a bonus to a truck driver for proper operation of a vehicle comprising;

a brake pedal pressure sensor for generating a brake pedal pressure signal representative of a brake pedal pressure signal representative of a brake pedal pressure of the vehicle;

a performance monitor for comparing the brake pedal pressure signal with a predetermined acceptable upper limit and generating a report when the upper limit is exceeded;

a receiver/transmitter for communicating data between the vehicle and a remote station, which is coupled to the performance monitor;

an input/output device coupled with the receiver/transmitter for displaying information to a truck driver and for providing driver input;

a speed sensor for generating a speed signal representative of a speed of the vehicle;

said performance monitor further for comparing the speed signal with a predetermined acceptable upper limit and generating a report when the upper limit is exceeded;

an RPM sensor, for generating RPM signal, representative of an engine RPM of the vehicle;

said performance monitor further for comparing the RPM signal with a predetermined acceptable upper limit in generating a report when the upper limit is exceeded;

a fuel flow sensor, for generating a fuel flow signal, representative of the rate of fuel consumption of the vehicle:

said performance monitor for comparing the fuel flow signal with a predetermined acceptable upper limit and generating a report when the upper limit is exceeded;

a gear shift position sensor, for generating a gear shift position signal, representative of a gear shift position of the vehicle;

said receiver/transmitter for transmitting said gear shift position signal to a remote base station; and, a printer coupled to the receiver/transmitter for printing bonus checks to a truck driver in response to signals received from the remote station.

* * * * *